United States Patent [19]

Marusue et al.

[11] Patent Number: 5,580,333
[45] Date of Patent: Dec. 3, 1996

[54] AUTOMATIC TRANSMISSION CONTROL SYSTEM FOR AUTOMOBILES

[75] Inventors: Toshihisa Marusue, Hiroshima; Takuji Fujiwara; Kazunori Enokido, both of Hiroshima-ken; Tatsutoshi Mizobe, Hiroshima; Hiroaki Yokota, Higashihiroshima; Shinya Kamada, Hiroshima, all of Japan

[73] Assignee: Mazda Motor Corporation, Hiroshima, Japan

[21] Appl. No.: 251,855

[22] Filed: May 31, 1994

[30] Foreign Application Priority Data

May 31, 1993 [JP] Japan ............................. 5-154206
Mar. 25, 1994 [JP] Japan ............................. 6-079673

[51] Int. Cl.⁶ .......................... F16H 61/04; F16H 61/06; F16H 61/08
[52] U.S. Cl. .......................... 477/145; 477/150; 477/162
[58] Field of Search .................................. 477/125, 126, 477/127, 130, 139, 143, 144, 145, 146, 147, 150, 152, 156, 159, 162

[56] References Cited

U.S. PATENT DOCUMENTS

| | | | |
|---|---|---|---|
| 4,033,203 | 7/1977 | Hirosawa et al. | 477/162 X |
| 4,539,870 | 9/1985 | Sugano | 477/145 X |
| 4,949,597 | 8/1990 | Ueki et al. | 477/143 X |
| 5,033,330 | 7/1991 | Okahara | 477/150 |
| 5,038,637 | 8/1991 | Sugano | 477/143 X |
| 5,113,724 | 5/1992 | Hayasaki | 477/150 X |
| 5,224,399 | 7/1993 | Baba et al. | 477/129 |
| 5,291,804 | 3/1994 | Kashihara et al. | 477/162 X |

FOREIGN PATENT DOCUMENTS 4-136561 5/1992 Japan .

*Primary Examiner*—Khoi Q. Ta
*Attorney, Agent, or Firm*—Keck, Mahin & Cate

[57] ABSTRACT

An automatic transmission control system for selectively locking and unlocking a plurality of frictional coupling elements is provided within an automatic transmission so as to place the automatic transmission into one of various possible gears. The control locks a specific one of the frictional coupling elements with locking pressure when the automatic transmission performs a specific gear shift and unlocks it by reducing the locking pressure when causing it to perform, an opposite gear shift reverse to the specific gear shift. The locking pressure is increased by way of a relatively high level of shelf pressure during the specific gear shift and reduced by way of a relatively low level of shelf pressure during the opposite gear shift.

7 Claims, 9 Drawing Sheets

AUTOMATIC TRANSMISSION CONTROL SYSTEM FOR AUTOMOBILES

BACKGROUND OF THE INVENTION

1. Field of the Invention

The present invention relates to a control system for an automobile automatic transmission and, more particularly, to an automatic transmission control system in which shelf pressure is controlled by a pressure controller, such as an accumulator, differently between locking and unlocking of a frictional coupling element of the automatic transmission.

2. Description of Related Art

Typically, automatic transmissions for automobiles have a torque converter and a transmission mechanism which includes a plurality of frictional coupling elements selectively coupled and uncoupled to place the automatic transmission into any one of a plurality of desired transmission modes and gears according to driving conditions. Selectively coupling and uncoupling of these frictional coupling elements is performed by the use of hydraulically operated actuators. In such an automatic transmission, which has, for instance, four forward gears, i.e. first to fourth gears, a specific one of these frictional coupling elements is coupled or locked for providing second (2nd) and fourth (4th) gears, which is hereafter referred to as a 2/4 frictional coupling element, and another specific frictional coupling element is released or unlocked for third (3rd) and 4th gears, which is hereafter referred to as a 3/4 frictional coupling element.

If the 2/4 frictional coupling element is configured by a band brake (a 2/4 band brake), a rotative counter element, which is braked or locked by the 2/4 band brake can possibly rotate in opposite directions between a 1–2 gear shift-up from the 1st gear to the 2nd gear and a 3–4 shift-up from the 3rd gear to the 4th gear. In such a configuration of the automatic transmission, if the rotative counter element rotates in a so-called leading direction, in which it is effectively braked by the 2/4 band brake, during the 1–2 shift-up from the 1st gear to the 2nd gear, it rotates in a trailing direction which is the trailing direction of the band brake and in which the 2/4 band brake is less effective, during the 3–4 gear shift. In such a case, because the 2/4 band brake does not provide its own servomechanism function during the 3–4 gear shift, an actuator needs a higher level of locking pressure to activate the 2/4 band brake for causing the 3–4 gear shift-up as compared with causing the 1–2 gear shift-up.

On the other hand, in an attempt to reduce shocks generated in an automatic transmission of this type when the frictional coupling elements are locked, it is typical that a hydraulic control circuit is designed and adapted to activate the actuator with hydraulic pressure changing in level by way of what is called "shelf pressure". The term "shelf pressure" as used in this specification shall mean and refer to a transitional level of pressure decreasingly changing at an incline or gradient more gentle before and after the change. This shelf pressure is generally developed by means of an accumulator in a pressure line leading to the actuator.

However, there occur some problems including responsiveness and shift shocks of the automatic transmission controlled by such a hydraulic control circuit equipped with the accumulator for producing shelf pressure in connection with the 2/4 frictional coupling element which is locked for more than one transmission gear. Specifically, in the case wherein the 2/4 frictional coupling element needs to be activated with a locking pressure at a level higher for the 3–4 gear shift than for the 1–2 gear shift, if the accumulator produces the shelf pressure suitable in level for the 1–2 gear shift then there is caused a deterioration of responsiveness of the automatic transmission to a demand of the 3–4 gear shift due to insufficiency of the locking pressure. Conversely, if the accumulator produces the shelf pressure suitable in level for the 3–4 gear shift, the 2/4 frictional coupling element is locked abruptly in excess during the 1–2 gear shift, so as to cause undesirable shift shocks.

In order to avoid such a problem for the automatic transmission shiftable to four forward gears, the hydraulic control circuit is provided with an accumulator having a locking pressure line leading to the 2/4 frictional coupling element and a back pressure chamber connected to a pressure line branching off from a locking pressure line leading to the 3/4 frictional coupling element. With this hydraulic control circuit, during a 3–4 gear shift from the 3rd gear with the 3/4 frictional coupling element having been locked to the 4th transmission gear, locking pressure having been introduced into the 3/4 frictional coupling element is supplied as back pressure into the back pressure chamber of the accumulator through the locking pressure line leading to the 2/4 frictional coupling element, so as to cause the accumulator to produce a high level of shelf pressure. On the other hand, during a 1–2 gear shift from the 1st gear with both 2/4 and 3/4 frictional coupling elements having been unlocked or released to the 2nd gear, since the 3/4 frictional coupling element is held unlocked or released, the locking pressure having been introduced into the 3/4 frictional coupling element is not supplied into the back pressure chamber of the accumulator, so as to cause the accumulator to produce a shelf pressure at a lower level as compared with during the 3–4 gear shift. In other words, a properly controlled shelf pressure is produced for both 3–4 gear shift, wherein the 2/4 frictional coupling element needs a high locking pressure, and 1–2 gear shift, wherein it does not needs a high locking pressure. Such an automatic transmission is known from, for instance, Japanese Unexamined Patent Publication No. 4-136561.

The automatic transmission described in the above publication, which features an accumulator with a back pressure chamber provided in a locking pressure line leading to a specific frictional element is supplied with a locking pressure from another specific frictional, is still subject to a problem of shift shocks caused during gear shifts.

Describing the shift shock problem by way of example, even during a 4–3 gear shift from the 4th gear to the 3rd gear, the locking pressure supplied to the 3/4 frictional coupling element is introduced into the back pressure chamber of the accumulator connected to the locking pressure line leading to the 2/4 frictional coupling element as well as during a 3–4 gear shift. In the automatic transmission, when performing a 3–4 gear shift, the transmission gear mechanism operates in an opposite such that a rotative counter element is braked. Accordingly, in order for the transmission mechanism to perform a satisfactory 3–4 gear shift, the 2/4 frictional coupling element needs as a necessary torque a total torque of a torque assigned thereto and an inert torque of the rotative counter element. If the shelf pressure is at a rather high level for the purpose of providing the 2/4 frictional coupling element with a sufficient torque during the 3–4 gear shift, the 2/4 frictional coupling element is abruptly unlocked or released at the end of the period of the supply of shelf pressure during a gear shift in the reverse direction, namely the 4–3 gear shift. This can possibly cause excessive shift shocks. On the other hand, if the shelf pressure is established at a lower level so as to be suitable for the 4–3 gear shift, then the 2/4 frictional coupling element needs a long time to be locked during the 3–4 gear shift, resulting in a deteriorated feeling of gear shift and/or shift shocks due to an excessive drop in output torque.

These problems are caused not only in automatic transmissions having a band brake type of 2/4 frictional coupling element which is locked for a 3–4 gear shift and unlocked for a 4–3 gear shift, but also in automatic transmissions having an ordinary multi-plate type of frictional coupling element which is locked to provide one gear and unlocked to provide another gear if pressure varies by way of the same level of shelf pressure during the gear shift from the one gear to the other and during the gear shift from the other gear to the one gear. In addition, these problems are also caused if an element or clean, such as a control valve, other than accumulators is or are used to generate such shelf pressure.

SUMMARY OF THE INVENTION

It is an object of the present invention to provide an automatic transmission control system whose hydraulic circuit has an accumulator or a control valve connected to a locking pressure line leading to a specific frictional coupling element which is used to cause gear shifts in opposite directions and which can produce a shelf pressure suitable for the gear shift in each of the opposite directions so as to perform both gear shifts satisfactorily without shift shocks.

The above object of the present invention is achieved by providing a control system for an automatic transmission which has a plurality of hydraulically controlled frictional coupling elements, including a specific frictional coupling element and its rotative counter element, which are selectively locked and unlocked to place the automatic transmission into any possible gears. These specific frictional coupling element and rotative counter element are locked with locking pressure developed in a pressure line leading to the specific frictional coupling element so as to restrict rotation of the rotative counter element when the automatic transmission accomplishes a specific gear shift, for instance a specific gear shift-up, to a specific one of the gears from another of the gears and are unlocked by reducing or discharging the locking pressure when the automatic transmission accomplishes an opposite gear shift, for instance a specific gear shift-down reverse to the specific gear shift-up. The automatic transmission control system includes a locking pressure control means, disposed in the pressure line, which develops the locking pressure in the pressure line so as to increase it by way of a level of shelf pressure during the specific gear shift-up and reduces the locking pressure by way of a level of shelf pressure during the opposite gear shift. The level of shelf pressure is varied between the specific and opposite gear shifts and, more specifically, is higher for the specific gear shift-up than for the opposite gear shift-down.

The locking pressure control means may be comprised of an accumulator disposed in the pressure line which is controlled with back pressure varied in level between the specific and opposite gear shifts. Specifically, the level of back pressure is established higher for the specific gear shift than for the opposite gear shift. In order to change the level of back pressure, a shift valve for switching developing of the locking pressure in the specific frictional coupling element and discharging or reducing of the locking pressure from the same may be used.

With the automatic transmission control system according to the invention, the locking pressure is increasingly or decreasingly changed by way of a level of shelf pressure which is appropriately changed, by being made higher for the specific gear shift than for the opposite gear shift. A higher level of shelf pressure prevents the specific frictional coupling element from allowing slippage in excess during the specific gear shift and enables the automatic transmission to accomplish the specific gear shift in a short time. A low level of shelf pressure avoids shift shocks caused in excess during unlocking of the specific frictional element. This provides drivers with a comfortable feeling of gear shift-up and -down between the specific and the other gears.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
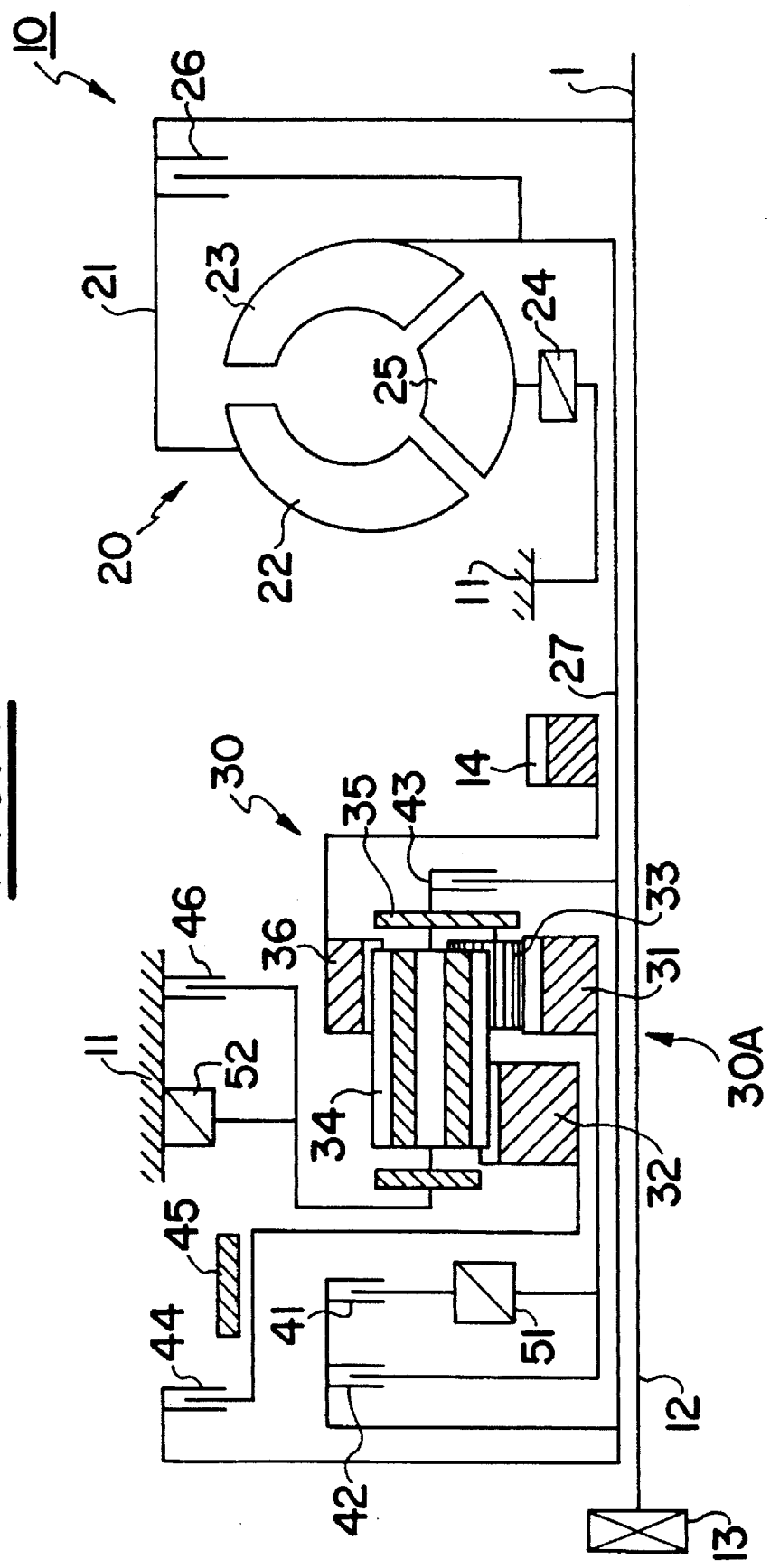
FIG. 1 is a schematic illustration of an automatic transmission in accordance with a preferred embodiment of the present invention.

Referring now to the drawings in detail and, in particular, to FIG. 1, an automatic transmission 10 equipped with a control system in accordance with a preferred embodiment of the present invention has a mechanical configuration including a torque converter 20 and a transmission gear mechanism 30. This transmission gear mechanism 30 includes various frictional coupling elements 41–46, such as clutches and brakes, and one-way clutches 51 and 52 which are selectively operated so as to provide different torque transferring paths of the transmission gear mechanism 30, thereby placing the automatic transmission 10 into desired ranges such as a drive (D) range, a second speed (S) range, a low speed (L) range and a reverse (R) range, and desired gears such as 1st to 4th gears in the drive (D) range, the 1st to 3rd gears in the second speed (S) range and the 1st and 2nd gears in the low speed (L) range.

The torque converter 20, which multiplies engine torque, has a driving and driven torus generally referred to as a pump 22 and a turbine 23, respectively, and a stator 25. The pump 22 is placed within and secured to a housing 21 secured to a pump shaft 12. The turbine 23, which is secured to a hollow turbine shaft 27 functioning as an input shaft of the transmission gear mechanism 30, is placed within the housing 21 so as to face the pump 22 and driven by the pump 22 by means of a special lightweight oil. The stator 25 is inserted between the pump and turbine 22 and 23 and mounted on a transmission housing 11 through a one-way clutch 24 so as to be allowed to spin in the direction of the pump 22. As is well known, the stator intercepts the oil thrown off by the turbine 23 and redirects the path of this oil so as to cause the oil to enter the pump 23 smoothly so as to perform engine output torque transmission and multiplication. The torque converter 20 further has a lock-up clutch 26 placed between the housing 21 and the turbine 23 for mechanically locking the pump 22, and hence the pump shaft 12, and the turbine 23 together when it is activated. An engine output shaft 1 is directly connected to, or otherwise formed integrally with, the pump shaft 12 passing through the hollow turbine shaft 27 and drives an oil pump 13 disposed on the rear end of the automatic transmission 10 opposite to the torque converter 20 with respect to the transmission gear mechanism 30. By means of this torque converter 20, engine output torque is multiplied and transmitted to the transmission gear mechanism 30.

The transmission gear mechanism 30 is consisted by a Labynio type of planetary gear 30A and various frictional coupling elements and one-way clutches. The planetary gear 30A comprises a small sun gear 31, a large sun gear 32 larger in diameter than the small sun gear 31, a plurality of short pinion gears 33, a long pinion gear 34 being longer in axial length and larger in diameter than the short pinion gear 33, a carrier 35 and a ring gear 36. These sun gears 31 and 32 are loosely mounted side by side on the turbine shaft 27 in order from the torque converter 20. The small pinion gears 33 are arranged around and in external engagement with the small sun gear 31. The long pinion gear 34 is in internal engagement with both short pinion gears 33 and large sun gear 32 and in external engagement with the ring gear 36. These short pinion gears 33 and long pinion gear 34 are independently supported for rotation by the carrier 35.

The transmission gear mechanism 30 includes various frictional coupling elements and one-way clutches. These frictional coupling elements includes a forward clutch (FWD) 41 and a coast clutch (CST) 42 disposed in parallel with each other between the turbine shaft 27 and the small sun gear 31, a third/fourth (3/4) clutch (3/4) 43 disposed between the turbine shaft 27 and the carrier 35, a reverse clutch (RVS) 44 disposed between the turbine shaft 27 and the large sun gear 32, a second/fourth (2/4) brake 45 such as a band brake disposed between large sun gear 32 and the reverse clutch 44 for braking the large sun gear 32, and a low-speed/reverse brake 46 (LRVB) disposed between the small sun gear 31 and the forward clutch 41. Further, a first one-way clutch (FOWC) 51 is disposed in series with the forward clutch 41 between the small sun gear 31 and the forward clutch 41, and a second one-way clutch (SOW) 52 is disposed in parallel with the low-speed/reverse brake 46 between the carrier 35 and the transmission housing 11. These frictional coupling elements 41-46 and one-way clutches 51 and 52 are selectively activated so as to place the transmission gear mechanism 30 into desired gears as shown in Table I.

TABLE I

| Range / Gear | | FWDC | CSTC | 3/4C | RVSC | 2/4B | LRVB | FOW | SOW |
|---|---|---|---|---|---|---|---|---|---|
| Park (P) | | | | | | | | | |
| Reverse (R) | | | | | o | | o | | |
| Neutral (N) | | | | | | | | | |
| Drive | 1st | o | | | | | | o | o |
| | 2nd | o | | | | o | | o | |
| | 3rd | o | o | o | | | | o | |
| | 4th | o | | o | | o | | | |
| Second | 1st | o | | | | | | o | o |
| | 2nd | o | o | | | o | | o | |
| | 3rd | o | o | o | | | | o | |
| Low | 1st | o | o | | | | o | o | o |
| | 2nd | o | o | | | o | | o | |

Specifically, at the 1st gear, the forward clutch 41 and the first and second one-way clutches 51 and 52 are locked, causing the transmission of output torque from the torque converter 20 to the small sun gear 31 of the planetary gear 30A through the turbine shaft 27 via the forward clutch 41 and the first one-way clutch 51. In this instance, the locked second one-way clutch 52 holds the carrier 35 of the planetary gear 30A operationally fixed with respect to the transmission housing 11, causing the planetary gear 30A to serve as a stable gear train which does not cause any differential motion for the transmission of output torque from the torque converter 20 to the ring gear 36 through the short and long pinion gears 33 and 34 via the small sun gear 31. As a result, at the 1st gear, the transmission gear mechanism 30 provides the largest reduction ratio corresponding to the ratio of diameter between the small sun gear 31 and the ring gear 36.

At the 2nd gear, the 2/4 brake 45 is applied simultaneously with unlocking of the second one-way clutch 52 while the forward clutch 41 and the first one-way clutch 51 are held locked. This disables the large sun gear 32 from rotating, so as to cause the transmission of output torque from the torque converter 20 to the long pinion gear 34 through the turbine shaft 27 via the small sun gear 31 and the short pinion gear 33. At this time, because the long pinion gear 34 remains in engagement with the large sun gear 32 disabled from rotating by the 2/4 brake 45, it rotates around the large sun gear 32 being accompanied by the carrier 35. This causes an increase in the rotation of the ring gear 36 corresponding to rotation of the carrier 35 (rotation of the long pinion gear 34 around the large sun gear 32) compared with when the transmission gear mechanism 30 is at the 1st gear, providing the transmission gear mechanism 30 in the 2nd gear with a reduction ratio smaller than in the 1st gear. In this instance, the 2/4 brake 45 is configured so as to apply brake force to a brake drum as a rotative counter element of the planetary gear 30A and restrain rotational motion of the brake drum in the leading direction during a 1-2 gear shift.

When the transmission gear mechanism 30 is placed into the 3rd gear, simultaneously with unlocking or releasing of the 2/4 brake 45, both coast clutch 42 and 3/4 clutch 43 are locked. As a result, transmission of output torque from the torque converter 20 is connected to the carrier 35 through the 3/4 clutch 43 as well as to the small sun gear 31 through the turbine shaft 27 via the forward clutch 41 and the first one-way clutch 51. This causes the planetary gear 30A to rotate as one whole at the same rotational speed as the turbine 23 of the torque converter 20 through the turbine shaft 27.

Further, at the 4th gear, the 2/4 brake 45, having been unlocked or released for the 3rd gear, is locked again, the transmission of output torque from the torque converter 20 is connected to the carrier 35 through the turbine shaft 27 via the 3/4 clutch 43, causing the long pinion gear 34 to rotate around the large sun gear 32 along with the carrier 35 and on its axis. As a result, the planetary gear 30A causes an increase in the rotation of the ring gear 36 by the total of the rotation of the carrier 35 (rotation of the turbine shaft 27) on the axis of the turbine shaft and the rotation of the long pinion gear 34 on its axis, putting the transmission gear mechanism 30 in the overdrive 4th gear. In this instance, since the first one-way clutch 51, which is in series with the forward clutch 41 held locked, is unlocked, the transmission of output torque from the torque converter 20 through the turbine shaft 27 is disconnected from the small sun gear 31. In this instance, during a 3-4 gear shift, when the 2/4 brake 45 is locked, it applies brake force to the brake drum as a rotative counter element of the planetary gear 30A and restrains rotational motion of the brake drum in the trailing direction. Accordingly, the brake drum needs brake force larger for a 3-4 gear shift than for a 1-2 gear shift.

In the reverse (R) range, both reverse clutch 44 and low-speed/reverse brake 46 are locked or applied, connecting the transmission of output torque from the torque converter 20 through the turbine shaft 27 to the large sun gear 32 with the carrier 35 operationally fixed. This brings the large sun gear 32, the long pinion gear 34 and the ring gear 36 into a steady gear train, so that the transmission gear mechanism 30 in the reverse (R) range provides a reduction ratio corresponding to the ratio of diameter between the large sun gear 32 and the ring gear 36. It is apparent that the ring gear 36 rotates in the direction opposite to the direction in which the large sun gear 32, and hence the turbine shaft 27, rotates.

In this instance, because the first one-way clutch 51, which connects the transmission of output torque from the torque converter 20 through the turbine shaft 27 at the 1st, 2nd or 3rd gear, and the second one-way clutch 52, which receives reaction force at the 1st gear are unlocked during coasting, engine braking is not available at these gears. However, engine braking is applied by locking the coast clutch 42 in parallel with the first one-way clutch 51 at the 3rd gear in the drive (D) range, the 2nd and 3rd gears in the second speed (S) range, and the 1st and 2nd gears in the low speed (L) range.

These frictional coupling elements 41–46 are activated by means of hydraulically controlled actuators (which are referred to as actuators for simplicity), such as pistons, which are selectively operated by a hydraulic control circuit 60.

Figure 2:
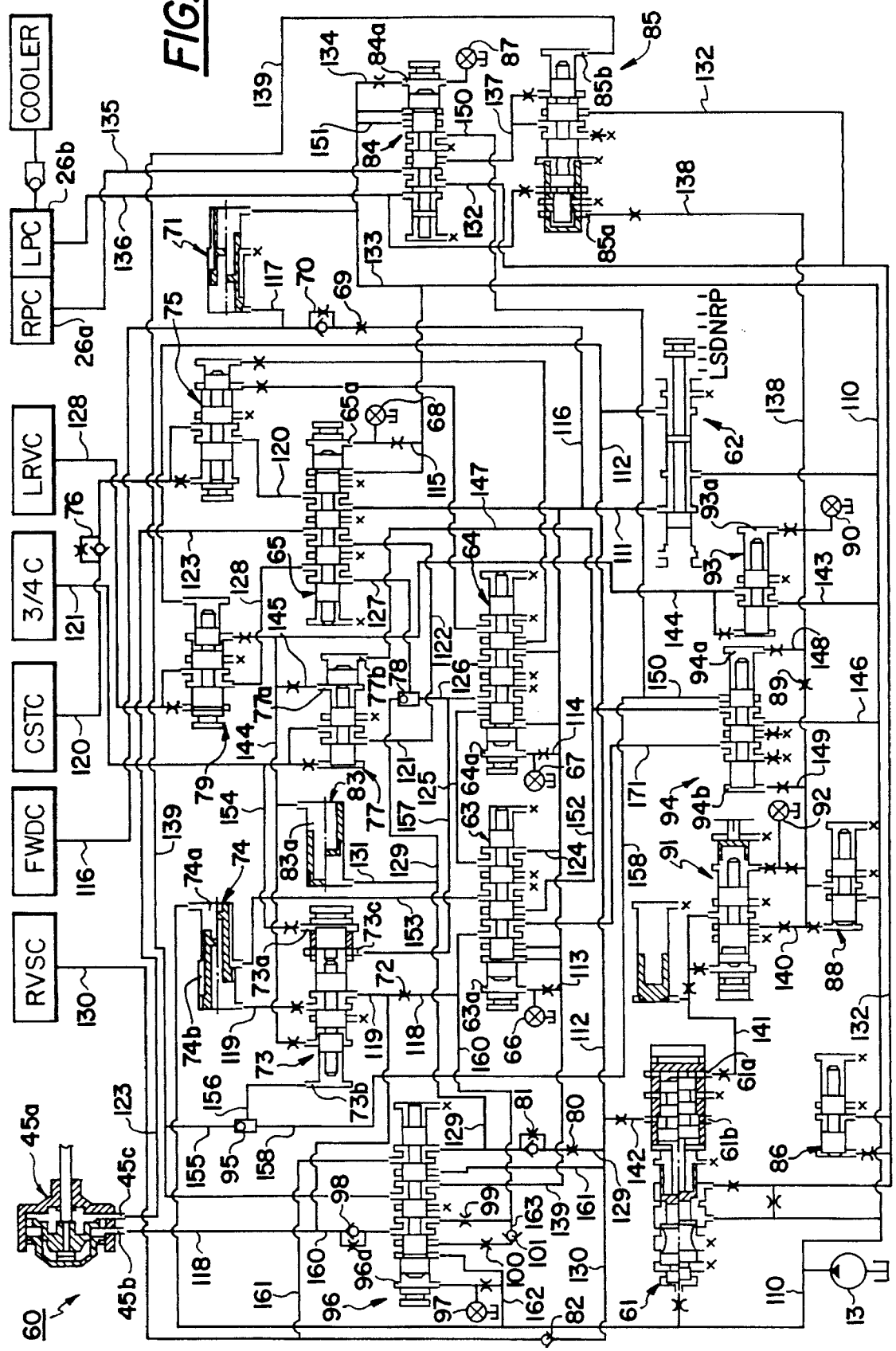
FIG. 2 is a diagram showing a hydraulic control circuit for the automatic transmission shown in FIG. 1.

Referring to FIG. 2, the hydraulic control circuit 60 which cooperates with the automatic transmission 10 includes various actuators. One of the actuator, namely a 2/4 brake actuator 45a for the 2/4 brake 45, comprises a hydraulically controlled servo piston having a brake apply pressure port (which is referred to as an apply pressure port for simplicity) 45b and a brake release pressure port (which is referred to as a release pressure port for simplicity) 45c, which may be of any type well known to those skilled in the art. This type of actuator 45a operates such that it activates the 2/4 brake 45 to be locked so as to apply the brake under the application of hydraulic pressure to the apply pressure port 45b only, and to be unlocked so as to release the brake when both apply and release pressure ports 45a and 45c are applied with hydraulic pressure, when neither the apply pressure port 45b nor the release pressure port 45c is applied with any hydraulic pressure, and when only the release pressure port 45c is applied with hydraulic pressure. Each of the actuators other than the 2—4 brake actuator 45a comprises an ordinary hydraulically controlled piston which may also be of any type well known to those skilled in the art. The hydraulic control circuit 60 further includes various valves, such as a regulator valve 61 for regulating pressure of a working oil discharged into a main pressure line 110 from the oil pump 13 to a certain level of line pressure, a range shift valve 62 which is manually operated to selectively place the automatic transmission 10 into any desired ranges, and first, second and third gear-shift valves 63, 64 and 65 for selectively activating the frictional coupling elements 41–46 according to possible gears.

The range shift valve 62 is manually operated to select three forward ranges, namely the drive (D) range, the second speed (S) range and the low speed (L) range, the reverse (R) range, the neutral (N) range and the park (P) range. The range shift valve 62 is configured such that it brings the main pressure line 110 into communication with a forward clutch pressure line 111 when selecting any one of the forward ranges and with a reverse pressure line 112 when selecting the reverse (R) range.

The first gear-shift valve 63 is provided at its one end with a control pressure port 63a which is in communication with the forward clutch pressure line 111 through a first control pressure line 113. Similarly, the second and third gear-shift valves 64 and 65 are provided at their one ends with control pressure ports 64a and 65a, respectively, which are in communication with the forward clutch pressure line 111 through a second control pressure line 114 and a third control pressure line 115, respectively. These first to third control pressure lines 113 to 115 are provided with first to third solenoid valves (SLDVs) 66, 67 and 68, respectively. The first solenoid valve 66 operates such that it drains a control pressure from the first gear-shift valve 63 at the control pressure port 63a when energized or turned ON so as to displace its spool 63b (see FIG. 4) to the one end in the left hand side position (which is referred to as a left end position) as viewed in FIG. 4 and introduces a control pressure into the first gear-shift valve 63 at the control pressure port 63a through the first control pressure line 113 when deenergized or turned OFF so as to displace the spool 63b to another end in the right hand side position (which is referred to as a right end position) as viewed in FIG. 4 against a spring (not shown). Similarly, the second solenoid valve 67 operates such that it drains a control pressure from the second gear-shift valve 64 at the control pressure port 64a when energized or turned ON so as to displace its spool in the left end position and introduces a control pressure into the second gear-shift valve 64 at the control pressure port 64a through the second control pressure line 114 when deenergized or turned OFF so as to displace the spool in the right end position against a spring (not shown). On the other hand, the third solenoid valve 68 operates such that it drains a control pressure from the third gear-shift valve 65 at the control pressure port 65a when energized or turned ON so as to displace its spool 65b (see FIG. 4) in the right end position and introduces a control pressure into the third gear-shift valve 65 at the control pressure port 65a through the third control pressure line 115 when deenergized or turned OFF so as to displace the spool 65b in the left end position against a spring (not shown). These first to third solenoid valves 66 to 68 are energized and deenergized or turned ON and OFF by a controller (which will be described in detail later) in various operative patterns predetermined according to vehicle speeds and engine throttle openings so as to selectively activate the frictional coupling elements 41 to 46 as shown in Table I for shifting the automatic transmission 10 into the 1st to 4th gears. The operative patterns of energization and deenergization of the solenoid valves are shown in Table II.

TABLE II

| Range | D Range | | | | S Range | | | L range | |
|---|---|---|---|---|---|---|---|---|---|
| Gear | 1st | 2nd | 3rd | 4th | 1st | 2nd | 3rd | 1st | 2nd |
| 1st SLDV | OFF | ON | ON | ON | OFF | ON | ON | OFF | ON |
| 2nd SLDV | ON | ON | OFF | OFF | ON | ON | OFF | ON | ON |
| 3rd SLDV | ON | ON | OFF | ON | ON | OFF | OFF | OFF | OFF |

A forward clutch pressure line 116 branches off from the forward clutch pressure line 111 which is brought into communication with the main pressure line 110 when the range shift valve 62 is operated so as to select any one of the forward ranges, namely the drive (D) range, the second speed (S) range and the low speed (L) range, and leads to the forward clutch 41 via a bi-directional or two-way orifice 69 and a one-way orifice 70. Through the forward clutch pressure line 116, the forward clutch 41 always applies locking pressure in each of the drive (D) range, the second speed (S) range and the low speed (L) range. The forward clutch pressure line 111, leading to the first gear-shift valve 63, is brought into communication with a brake apply pressure line 118 when the first gear-shift valve 63 is forced to displace its spool 63b into the left end position resulting from energization of the first solenoid valve 66, introducing hydraulic pressure into the 2/4 brake actuator 45a at the apply pressure port 45b via a two-way orifice 72. Consequently, when the first solenoid valve 66 is energized or turned ON in the forward ranges, in other words, when hydraulic pressure is introduced into the 2/4 brake actuator 45a only at the apply pressure port 45b at the 2nd, 3rd or 4th gear in the drive (D) range, at the 2nd or 3rd gears in the second speed (S) range, and at the 2nd gear in the low speed (L) range, the 2/4 brake 45 is applied.

The forward clutch pressure line 111 also leads to the third gear-shift valve 65 and is brought into communication with a coast clutch pressure line 120 when the third gear-shift valve 65 is forced to displace its spool 65b into the left end position resulting from deenergization of the third solenoid valve 68. This coast clutch pressure line 120 leads to the coast clutch 42 via a reducing valve 75 and a one-way orifice 76. Consequently, when the third solenoid valve 68 is deenergized or turned OFF in the forward ranges, in other words, at the 3rd gear in the drive (D), at the 2nd gear or the 3rd gear in the second speed (S) range, and the 1st gear or 2nd gear in the low speed (L) range, the coast clutch 42 is locked.

The forward clutch pressure line 111 further leads to the second gear-shift valve 64 and is brought into communication with a 3/4 clutch pressure line 121 leading to the 3/4 clutch 43 via a control valve 77 when the second gear-shift valve 64 is forced to displace its spool into the right end position resulting from deenergization of the second solenoid valve 67. By means of this 3/4 clutch pressure line 121, when second solenoid valve 67 is deenergized or turned OFF in the forward ranges, in other words, at the 3rd or 4th gear in the drive (D) range and at the 3rd gear in the second speed (S) range, the 3/4 clutch 43 is locked. In this instance, a pressure line 122 branching off from the 3/4 clutch pressure line 121 leads to the third gear-shift valve 65 and is brought into communication with a brake release pressure line 123 leading to the release pressure port 45c of the actuator 45a when the third gear-shift valve 65 is forced to displace its spool 65b into the left end position resulting from energization of the third solenoid valve 68. Consequently, when both second and third solenoid valves 67 and 68 are deenergized or turned OFF in the forward ranges, in other words, at the 3rd gear in the drive (D) range and in the second speed (S) range, release pressure is introduced into the actuator 45a at the release pressure port 45c, releasing the 2/4 brake 45.

A pressure line 124 branching off from the forward clutch pressure line 111 and leading to the first gear-shift valve 63 is brought in communication with a pressure line 125 leading to the second gear-shift valve 64 when the first gear-shift valve 63 is forced to displace its spool 63b into the right end position resulting from deenergization of the first solenoid valve 66. On the other hand, a pressure line 126, which is connected to the second gear-shift valve 64 and brought into communication with the pressure line 125 when the second gear-shift valve 64 is forced to displace its spool into the left end position resulting from energization of the second solenoid valve 67, leads to the third solenoid valve 68 through a pressure line 127 via a ball valve 78. This pressure line 127 is brought into communication with a low-speed/reverse brake pressure line 128 connected to the low-speed/reverse brake 46 through a reducing valve 79 when the third gear-shift valve 65 is forced to displace its spool 65b into the left end position resulting from deenergization of the third solenoid valve 68. In other words, the first to third solenoid valves 66 to 68 are deenergized, energized and deenergized or turned OFF, ON and OFF, respectively, in the forward ranges, in other words, at the 1st gear in the low speed (L) range, to operate the low-speed/reverse brake 46.

The reverse pressure line 112, which is in communication with the main pressure line 110 in the reverse (R) range, leads to the third gear-shift valve 65 through a pressure line 129 branching off from the reverse pressure line 112 and provided with a two-way orifice 80 and a one-way orifice 81 and then the pressure line 127 connected to the pressure line 129 via the ball valve 78. This reverse pressure line 112 is brought into communication with the low-speed/reverse brake pressure line 128 when the third gear-shift valve 65 is forced to displace its spool 65b into the left end position resulting from deenergization of the third solenoid valve 68. This reverse pressure line 112 also leads to the reverse clutch 44 through a reverse clutch pressure line 130 connected to the reverse pressure line 112 through a check valve 82. Accordingly, in the drive (D) range, the reverse clutch 44 is held locked, while the low-speed/reverse brake 46 is applied when the third solenoid valve 68 is deenergized or turned OFF. In this instance, the forward clutch pressure line 116 is connected to a neutral/drive (N/D) accumulator 71 through a pressure line 117. Further, the brake apply pressure line 118 is connected to a first/second (1/2) accumulator 74 through a pressure line 119 in which an accumulation cut valve 73, and the pressure line 129 is connected to a neutral/reverse (N/R) accumulator 83 through a pressure line 131 branching off from the pressure line 129 between the one-way orifice 81 and the ball valve 78.

The hydraulic control circuit 60 further includes a torque converter shift valve or fourth shift valve 84 and a lock-up control valve 85 for activating the lock-up clutch 26 of the torque converter 20. A converter shift pressure line 132 extending from the regulator valve 61 and provided with a relief valve 86 is connected to both fourth shift valve 84 and lock-up control valve 85. Further, a pressure line 134, which extends from a pressure line 133 branching off from the main pressure line 110, is connected to the fourth shift valve 84 at its control pressure port 84a where a fourth solenoid valve 87 is connected. The fourth shift valve 84 is forced to place its spool into the left end position when the fourth solenoid valve 87 is deenergized or turned OFF so as to bring the converter shift pressure line 132 into communication with a release pressure line 135 leading to a release pressure chamber (RPC) 26a of the torque converter 20. When the release pressure chamber (RPC) 26a is supplied with working oil as a control pressure, the lock-up clutch 26 is unlocked so as to release the torque converter 10 and enable it to allow slippage. ON the other hand, when the fourth solenoid valve 87 is energized or turned ON and drains the working oil from the fourth shift valve 84 through the control pressure port 84a, the fourth shift valve 84 allows the spool to move into the left end position, bringing the converter shift pressure line 132 into communication with a lock-up pressure line 136 leading to a lock-up pressure chamber (LPC) 26b of the torque converter 20. When the lock-up pressure chamber (LPC) 26a is supplied with working oil as a control pressure, the lock-up clutch 26 is locked so as to mechanically lock the pump and turbine 22 and 23 of the torque converter 10 together. At this time, the release pressure line 135 is brought into communication with a connecting pressure line 137 leading to the lock-up control valve 85 through the fourth shift valve 84, applying working oil regulated in pressure level by the lock-up control valve 85 as a release pressure to the release pressure chamber (RPC) 26a of the lock-up clutch 26.

In other words, the lock-up control valve 85 is connected at the control pressure port 85a provided at one end thereof to a control pressure line 138 leading from the main pressure line 110 via a reducing valve 88 and at a regulation-interruption pressure port 85b provided at another end thereof to a regulation-interruption pressure line 139 leading to the forward clutch pressure line 111. A first duty solenoid valve 90 provided in the control pressure line 138 downstream from a two-way orifice 89 as viewed from the reducing valve 88 regulates the control pressure to be supplied to the lock-up control valve 85 at the control pressure port 85a according to duty rates at which it periodically opens and closes. On condition of no supply of line pressure to the lock-up control valve 85 at the regulation-interruption pressure port 85b through the regulation-interruption pressure line 139, the first duty solenoid valve 90 regulates the difference between a lock-up pressure supplied into the lock-up pressure chamber (LPC) 26b of the lock-up clutch 26 through the converter shift pressure line 132 and the lock-up pressure line 136 and a release pressure supplied into the release pressure chamber (RPC) 26a of the lock-up clutch 26 through the release pressure line 135 and the connecting pressure line 137, permitting the lock-up clutch 26 to allow slippage. On the other hand, when a line pressure is supplied to the lock-up control valve 85 at the regulation-interruption pressure port 85b through the regulation-interruption pressure line 139, the lock-up control valve 85 holds its spool displaced in the left end position, so as to drain the working oil in the release pressure chamber (RPC) 26a of the torque converter 20 through the release pressure line 135 and the connecting pressure line 137 via the fourth shift valve 84, thereby causing the lock-up clutch 26 to mechanically lock the pump and turbine 22 and 23 of the torque converter 10 together. In this instance, the lock-up control valve 85 is provided with an orifice (not shown) at the drain port designed and adapted to prevent the working oil from being drained in excess even when the working oil flows into the lock-up pressure chamber (LPC) 26a from the lock-up pressure chamber (LPC) 26b through the release pressure line 135 and the lock-up pressure line 136 via the fourth shift valve 84. The first duty solenoid valve 90 is designed and adapted to provide a decrease in pressure level with an increase in duty rate D1. Specifically, when the first duty solenoid valve 90 operates at a duty rate D1 of 100 %, the lock-up control valve 85 functions with its drain port always opened, decreasing the pressure level in the converter shift pressure line 132 downstream from the two-way orifice 89 to the level of zero (0). Contradistinctly, when the first duty solenoid valve 90 operates at a duty rate D1 of 0 %, the lock-up control valve 85 functions with its drain port always closed, holding the pressure in the converter shift pressure line 132 downstream from the two-way orifice 89 at the highest level.

The hydraulic control circuit 60 also includes a pressure modulation valve 91 for controlling the line pressure regulated by the regulator valve 61 and a second duty solenoid valve 92 for causing the modulation valve 91 to perform pressure modulation. This pressure modulation valve 91 is connected to a pressure line 140 leading to the main pressure line 110 through the reducing valve 88. A control pressure regulated by the second duty solenoid valve 92, periodically opening and closing at duty rate D2, is introduced into the modulation valve 91 at its control pressure port 91a so as to cause the modulation valve 91 to produce a modulated pressure according to the duty rates D2. In this instance, the duty rate D2 is established according, for instance, to engine throttle openings. This modulated control pressure corresponding to an engine throttle opening is introduced into the regulator valve 61 at its first pressure increase port 61a through a pressure line 141, causing the regulator valve 61 to increase the line pressure according to an increase in throttle opening. On the other hand, the regulator valve 61 is connected at its second pressure increase port 61b to a pressure line 142 branching off from the reverse pressure line 112 so as to increase the line pressure more in the reverse (R) range. The control pressure which is regulated as lock-up pressure for the lock-up clutch 26 by the first duty solenoid valve 90 is also introduced into a modulation valve 93 at its control pressure port 93a. This modulation valve 93 modulates the line pressure introduced therein through a pressure line 143 branching off from the main pressure line 110 according to the control pressure regulated by the first duty solenoid valve 90 and supplies the modulated control pressure into a back pressure chamber of the N/R accumulator 83 through a pressure line 144.

In this instance, because the control valve 77 provided in the 3/4 clutch pressure line 121 is connected at its control pressure port 77a to a pressure line 145 branching off from the pressure line 144, activation of the first duty solenoid valve 90 at a duty rate D1 causes the modulation valve 93 to produce a modulated pressure according to the duty rate D1 and supply it into the control valve 77. Accordingly, the control valve 77 produces a locking pressure for the 3/4 clutch according to the duty rate D1. On the other hand, the control valve 77 is connected at its regulation-interruption pressure port 77b to a regulation-interruption pressure line 152 leading to the main pressure line 110 through a pressure line 146 via a switching valve 94. When the switching valve 94 communicates the regulation-interruption pressure line 152 with the pressure line 146, the line pressure is introduced into the control valve 77 at the regulation-interruption pressure port 77b from the main pressure line 110 and interrupts the regulative operation of the control valve 77. More specifically, the switching valve 94 is connected at its control pressure port 94a at its one end to a pressure line 148 branching off from the control pressure line 138 between the two-way orifice 89 and the first duty solenoid valve 90 and at a balancing pressure port 94b at another end thereof to a pressure line 149 branching off from the control pressure line 138 upstream from the two-way orifice 89. The switching valve 94 forces its spool 94c (see FIG. 4) in the left end position when the control pressure produced by the first duty solenoid valve 90 is above a predetermined level, and brings the regulation-interruption pressure line 152 into communication with the main pressure line 110 through the pressure line 146. As a result, the line pressure is introduced into the control valve 77 at the regulation-interruption pressure port 77b from the main pressure line 110, so as to interrupt the regulative operation of the control valve 77. On the other hand, when the control pressure produced by the first duty solenoid valve 90 drops below the predetermined level, the switching valve 94 forces its spool 94c in the left end position, so as to bring the regulation-interruption pressure line 152 into disconnection from the pressure line 146.

The switching valve 94 is further connected to a pressure line 150 leading to the fourth shift valve 84. This pressure line 150 is brought into communication with the regulation-interruption pressure line 152 when the switching valve 94 forces the spool 94c in the right end position and also with a pressure line 151 leading to the main pressure line 110 through the pressure line 133 when the fourth shift valve 84 forces the spool in the left end position. In other words, when the locking pressure of the lock-up clutch 26 is controllable during energization or turning ON of the fourth solenoid valve 87, the line pressure is introduced into the regulation-interruption pressure line 152 through the pressure line 133, and the pressure lines 151 and 150 via the fourth shift valve 84. When the fourth shift valve 84 forces the spool in the left end position for controlling of the lock-up clutch 26 to cause the torque converter 20 to allow some slippage, it brings the pressure line 150 into communication with a drain port thereof. The switching valve 94 is further connected to the pressure line 152 which is brought into communication with the brake apply pressure line 118 when the first gear-shift valve 63 forces the spool 63b in the right end position, or otherwise which is brought into communication selectively with drain ports (not shown) which drain at different rates. The first gear-shift valve 63 is connected to a pressure line 153 branching off from the regulation-interruption pressure line 152 and when it forces its spool in the left end position it brings the pressure line 153 into communication with a pressure line 154 leading to a second back pressure chamber 74b of the 1/2 accumulator 74 whose first back pressure chamber 74a is always supplied with the line pressure from the main pressure line 110. Accordingly, while the line pressure is supplied with the regulation-interruption pressure line 152, it is also supplied into the second back pressure chamber 74b of the 1/2 accumulator 74 through the pressure lines 153 and 154 only when the first gear-shift valve 63 holds the spool 63b in the left end position.

The accumulation cut valve 73 is connected at its control pressure port 73a provided at its one end to a pressure line 155 branching off from the 3/4 clutch pressure line 121 downstream from the control valve 77 and at its accumulation cut interruption pressure port 73b provided at another end to a pressure line 157 leading to the regulation-interruption pressure line 139 of the lock-up control valve 85 through a pressure line 156 via a ball valve 95. The accumulation cut valve 73 is further connected at its intermediate port 73c provided at its middle to a pressure line 158 branching off from the pressure line 126 leading to the second gear-shift valve 64. The ball valve 95 is disposed between the pressure line 156 and a pressure line 159 branching off from the pressure line 150 leading between the switching valve 94 and the fourth shift valve 84.

The hydraulic control circuit 60 further includes a fifth shift valve 96 for controlling gear shift timing. This fifth shift valve 96 is connected to a first bypass pressure line 160 bypassing the two-way orifice 72 disposed in the brake apply pressure line 118, a second bypass pressure line 161 bypassing the check valve 82 disposed in the reverse clutch pressure line 130, a control pressure line 162 branching off from the main pressure line 110, and the regulation-interruption pressure line 139 leading to the lock-up control valve 85. With energization and deenergization or turning ON and OFF of a fifth solenoid valve 97 connected to the control pressure line 162, the fifth shift valve 96 displaces its spool between the left and right end positions so as to open and close selectively the first and second bypass pressure lines 160 and 161 and the regulation-interruption pressure line 139. Specifically, when the fifth solenoid valve 97 is deenergized or turned OFF, the fifth shift valve 96 forces the spool in the right end position, so as, on one hand, to open both first bypass pressure line 160 and regulation-interruption pressure line 139 and, on the other hand, to close the second bypass pressure line 161. In this state, the second bypass pressure line 161 is brought into communication with the pressure line 129 provided with a two-way orifices 80 and a one-way orifice 81, and hence with both reverse clutch pressure line 130 and reverse pressure line 112. On the other hand, when the fifth solenoid valve 97 is energized or turned ON, the fifth shift valve 96 forces the spool in the left end position, so as, on one hand, to close both first bypass pressure line 160 and regulation-interruption pressure line 139 and, on the other hand, to open the second bypass pressure line 161.

The first bypass pressure line 160 includes a one-way orifice 98 provided downstream from the fifth shift valve 96 which is effective in restricting a working oil flowing toward the actuator 45a and a two-way orifice 99 provided upstream from the fifth shift valve 96. A pressure line 164, which branches off from the first bypass pressure line 160 downstream from the two-way orifice 99, is provided with a two-way orifice 100 which restricts a working oil flow at a rate smaller than the two-way orifice 99 and a one-way valve 101 for interrupting a working oil flow toward the fifth shift valve 96. The pressure line 164 is brought into communication with the first bypass pressure line 161 when the fifth solenoid valve 97 is energized or turned ON so as to displace the spool into the left end position.

Figure 3:
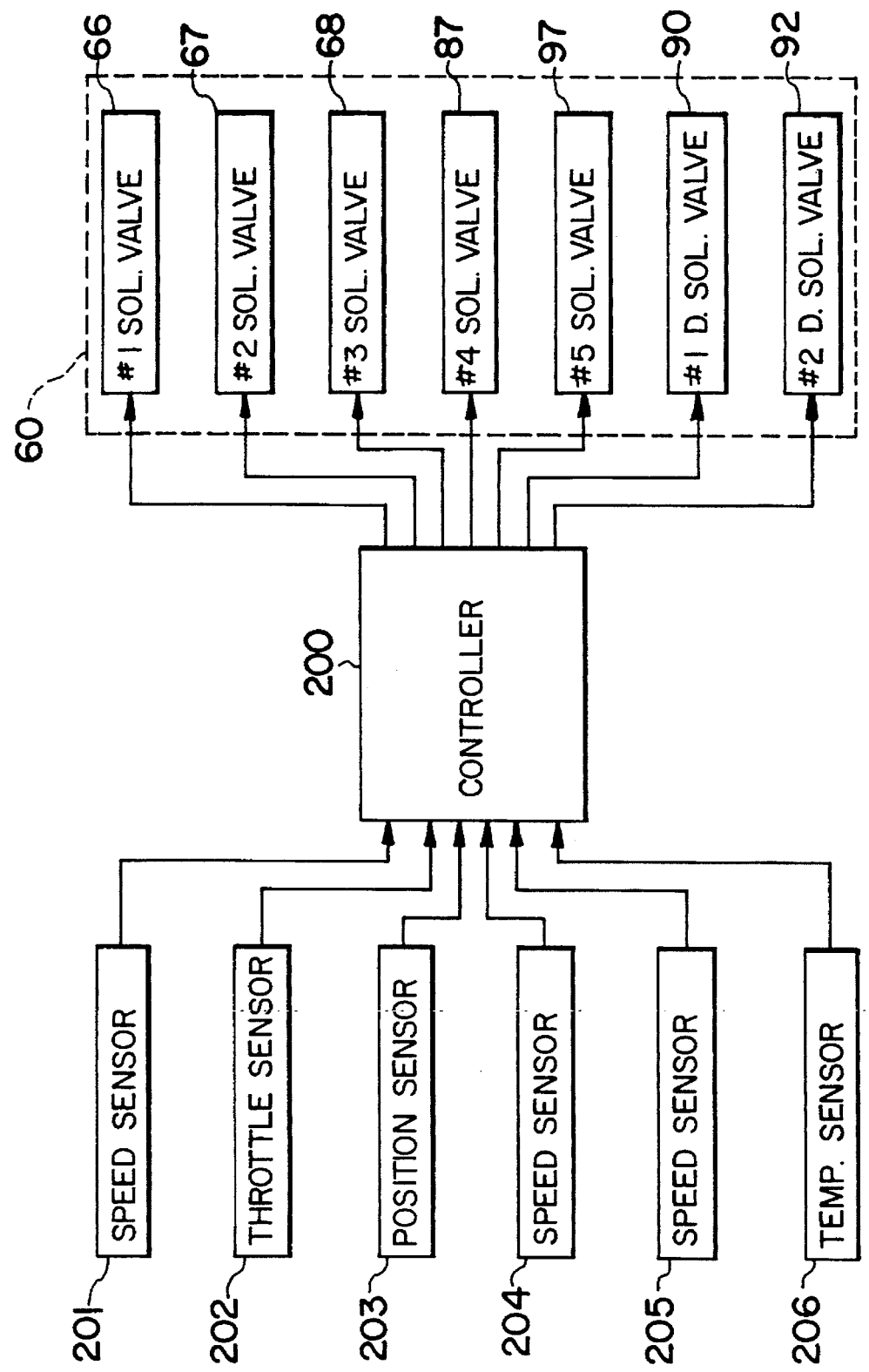
FIG. 3 is a block diagram showing a controller for various valves of the hydraulic control circuit.

These first to third solenoid valves 66–68, 87 and 97, and first and second duty solenoid valves 90 and 92 are operated by means of a controller 200 shown in FIG. 3.

Referring to FIG. 3, the controller 200 receives various signals, such as a signal from a speed sensor 201 representative of a vehicle speed, a signal from a throttle opening sensor 202 representative of an opening of an engine throttle, a signal from a position sensor 203 representative of a selected range position, a signal from a speed sensor 204 representative of an engine speed, a signal from a speed sensor 205 representative of a turbine speed, and a signal from a temperature sensor 206 representative of a temperature of the working oil in the hydraulic control circuit 60. These sensors 201–206 are well known in the art and may take any known type. According to these signals indicating driving conditions and driver's demands, the controller 200 controls the solenoid valves 66–68, 87, 90, 92 and 97.

In the operation of the automatic transmission 10, when the automatic transmission 10 performs shift operation in an invented manner, such as for instance, between a shift-up from the 3rd gear to the 4gear, namely a 3–4 shift, and a shift-down from the 4gear to the 3rd gear, namely a 4–3 shift, since, in the 3–4 shift-up, the transmission gear mechanism 30 makes the planetary gear 30A restrain rotation of the large sun gear 32, in order for the 2/4 brake 45 to be smoothly locked, getting over inert torque, a high locking pressure is needed as compared with the 4–3 shift-down which is performed by unlocking of the 2/4 brake only. For this reason, a shelf pressure (which refers to a pressure changing at a small incline between relatively steep changes) produced by the 1/2 accumulator 74 connected to the actuator 45a of the 2/4 brake 45 through the brake apply pressure line 118 during shifting is differently controlled between the 3–4 shift-up, in which the 2/4 brake 45 needs a high locking pressure, and the 4–3 shift-down, in which providing of a high locking pressure is undesirable for the 2/4 brake 45.

Figure 5:
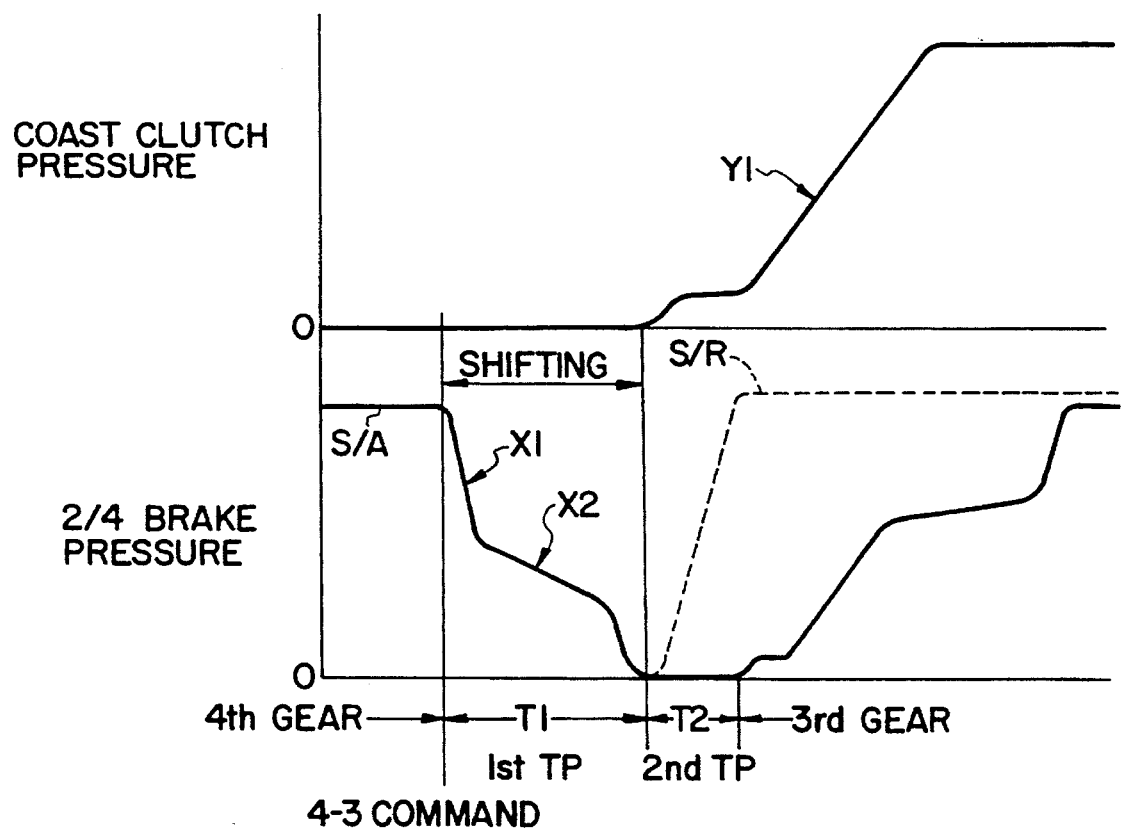
FIG. 5 is a time chart showing changes in control pressure for the 4–3 gear shift.
Figure 6:
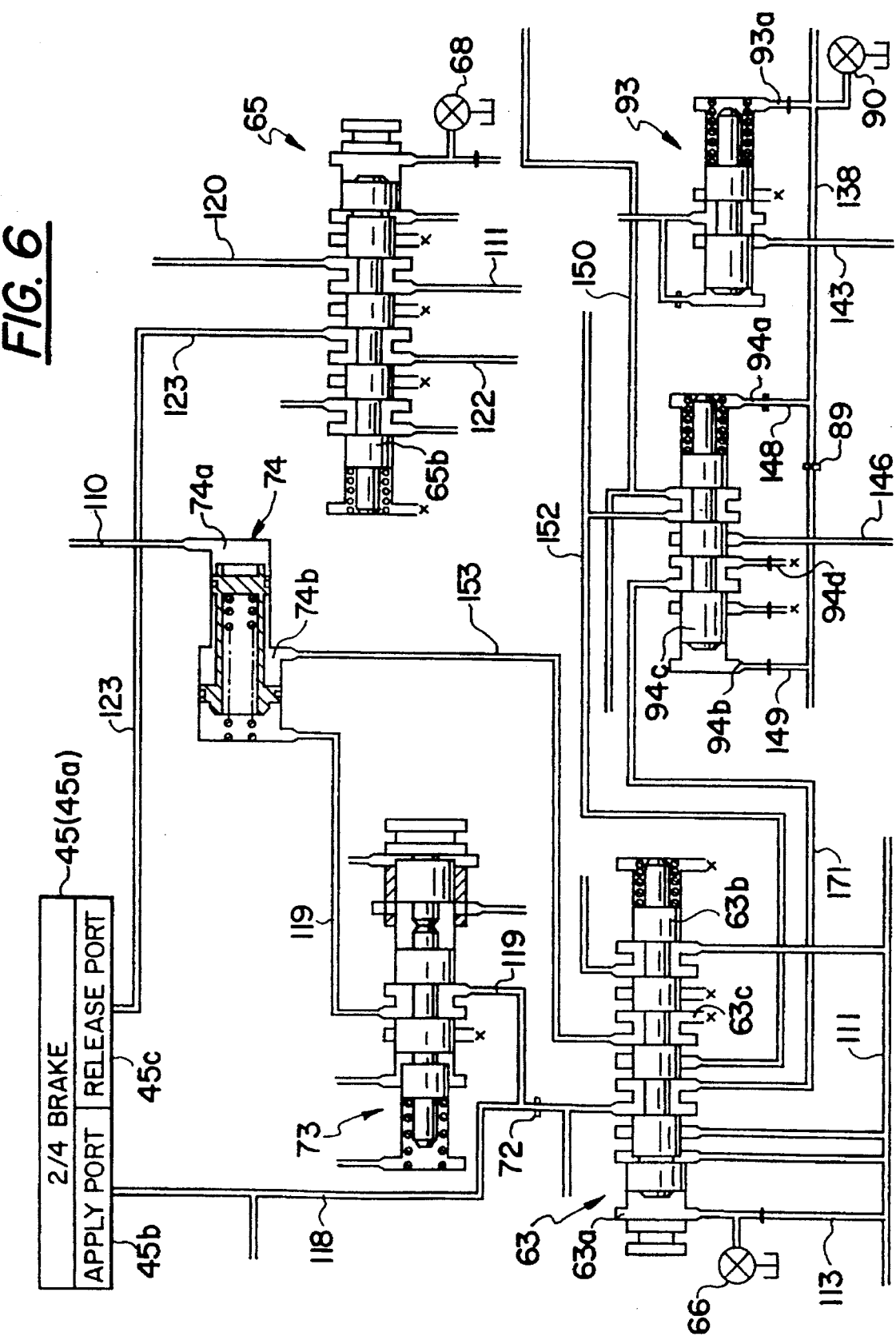
FIG. 6 is an enlarged diagram showing an essential part of the hydraulic control circuit which is under the operation of 3–4 gear shift.

Specifically referring to FIGS. 5 and 6, when there occurs a demand of a 4–3 shift-down due to a change in driving condition of the vehicle traveling with the automatic transmission 10 placed in the 4gear, the first to third solenoid valves 66–68 are operated in such a way that energization and deenergization or turning ON and OFF of the first to third solenoid valves 66–68 is changed from a fourth gear pattern (4GP) to a third gear pattern (3rd GP) through first and second transitional patterns (1st and 2nd TP) in order as shown in Table III. In this instance, both 4–3 shift-down and 3–4 shift-up are performed with lock-up clutch 26 controlled to place the torque converter 20 so as to allow slippage.

TABLE III

|  | (4-3 Shift-Down) | | | |
| --- | --- | --- | --- | --- |
|  | 4th GP | 1st TP | 2nd TP | 3rd GP |
| 1st Solenoid Valve | ON | OFF | OFF | ON |
| 2nd Solenoid Valve | OFF | OFF | OFF | OFF |
| 3rd Solenoid Valve | ON | ON | OFF | OFF |

Figure 4:
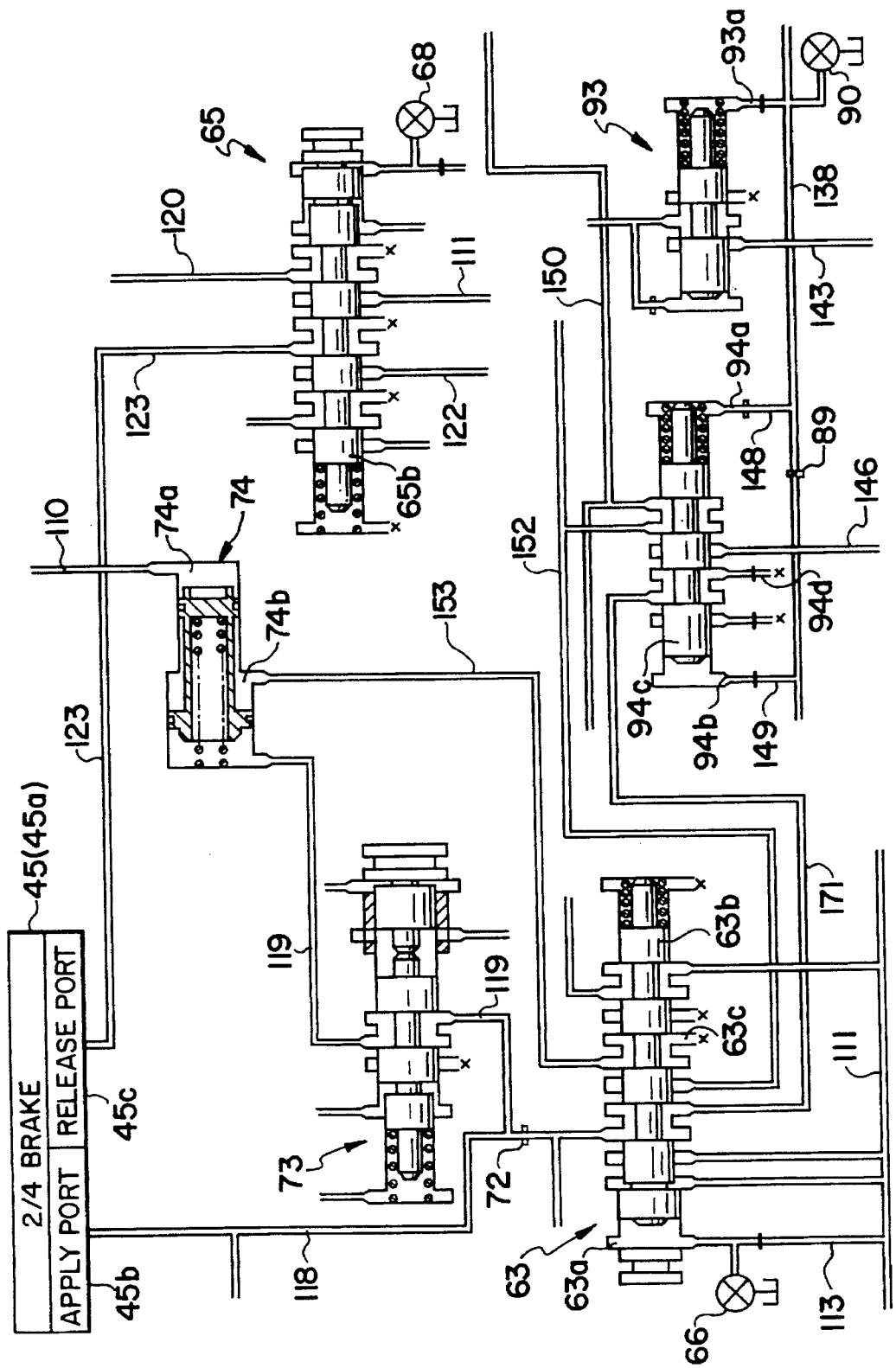
FIG. 4 is an enlarged diagram showing an essential part of the hydraulic control circuit which is under the operation of a 4–3 gear shift.

As apparent, when a 4–3 shift command is provided, the controller 200 selectively turns the first to third solenoid valves 66–68 in the fourth gear pattern (4GP) wherein only the second solenoid valve 67 has been turned OFF so that they take the first transitional pattern (1st TP). As a result, only the first solenoid valve 66 is turned OFF leaving the second and third solenoid valves 67 and 68 unchanged. Then, the first gear-shift valve 63 forces the spool 63b in the right end position as shown in FIG. 4, so as to bring the brake apply pressure line 118 leading to the actuator 45a at the apply pressure port 45b into communication with the drain pressure line 152 leading to the switching valve 94 at a pressure drain port 94d. Accordingly, brake apply pressure (S/A) is drained from the actuator 45a through the switching valve 94 via the apply pressure port 45b. At this time, since the first gear-shift valve 63 brings also the pressure line 153 leading to the second back pressure chamber 74b of the 1/2 accumulator 74 into communication with the first gear-shift valve 63 at its drain port 63c, only the line pressure introduced into the first back pressure chamber 74a of the 1/2 accumulator 74 from the main pressure line 110 is exerted as back pressure on the 1/2 accumulator 74. Consequently, during the first transitional period (T1) of 4–3 shift-down, after the brake apply pressure (S/A) has dropped rapidly as shown by a reference X1 in FIG. 5, it drops down gently providing a shelf pressure as shown by a reference X2 in FIG. 5.

When the brake apply pressure (S/A) drops sufficiently close to a level of zero (0) at the end of the first transitional period (T1) after the commencement of 4–3 shift-down, the controller 200 selectively turns the first to third solenoid valves 66–68 in the first transitional pattern (1st TP) wherein only the third solenoid valve 68 has been turned ON so that they take the second transitional pattern (2nd TP). As a result, the third solenoid valve 68 is turned OFF leaving the second and third solenoid valves 67 and 68 turned OFF. This causes the third gear-shift valve 65 to displace its spool 65b into the left end position from the right end position shown in FIG. 4, bringing the brake release pressure line 123 into communication with the pressure line 122 branching off from the 3/4 clutch pressure line 121 and simultaneously the coast clutch pressure line 120 with the forward clutch pressure line 111 leading to the third gear-shift valve 65. This causes the line pressure introduced into the third gear-shift valve 65 from the second gear-shift valve 64 through the pressure line 122 to be applied as a brake release pressure (S/R) into the release pressure port 45c of the actuator 45a through the brake release pressure line 123 and simultaneously with this, the line pressure in the forward clutch pressure line 111 leading to the third gear-shift valve 65 is applied as a coast clutch locking pressure to the coast clutch 42 through the coast clutch pressure line 120. At this time, because the provision of the one-way orifice 76 in the coast clutch pressure line 120 which allows the flow of working oil in the direction of oil supply only, the coast clutch locking pressure raises in level gradually as shown by a reference Y1, so as to cause the coast clutch to be smoothly locked. Further, at the end of the second transitional period (T2), the first to third gear-shift valves 63–65 are turned into and hold the third gear pattern (3rd GP). In the third gear pattern (3rd GP), the first solenoid valve 66 is energized or turned ON, forcing the first gear-shift valve 63 to displace the spool 63b into the left end position from the right end position as shown in FIG. 4, so as to bring the brake apply pressure line 118 into communication with the forward clutch pressure line 111, thereby supplying the line pressure introduced into the first gear-shift valve 63 through the forward clutch pressure line 111 as a brake apply pressure into the apply pressure port 45c of the actuator 45a through the brake apply pressure line 118 and the first bypass pressure line 160. As described above, providing a time delay of pressure introduction between brake supply pressure and brake release pressure avoids an accidental re-locking of the 2/4 brake 45.

On the other hand, when a 3–4 shift command is provided due to a change in driving condition of the vehicle with the automatic transmission 10 placed in the 3rd gear, then, a 3–4 shift-up operation takes place in the automatic transmission 10. In this instance, the first to third solenoid valves 66–68 are operated in such a way that energization and deenergization or turning ON and OFF of the first to third solenoid valves 66–68 is changed from the third gear pattern (3rd GP) to the fourth gear pattern (4GP) through the second and first transitional patterns (2nd and 1st TPs) in order as shown in Table IV.

TABLE IV

|  | (3-4 Shift-Up) | | | |
| --- | --- | --- | --- | --- |
|  | 3rd GP | 2nd TP | 1st TP | 4th GP |
| 1st Solenoid Valve | ON | OFF | OFF | ON |
| 2nd Solenoid Valve | OFF | OFF | OFF | OFF |
| 3rd Solenoid Valve | OFF | OFF | ON | ON |

Figure 7:
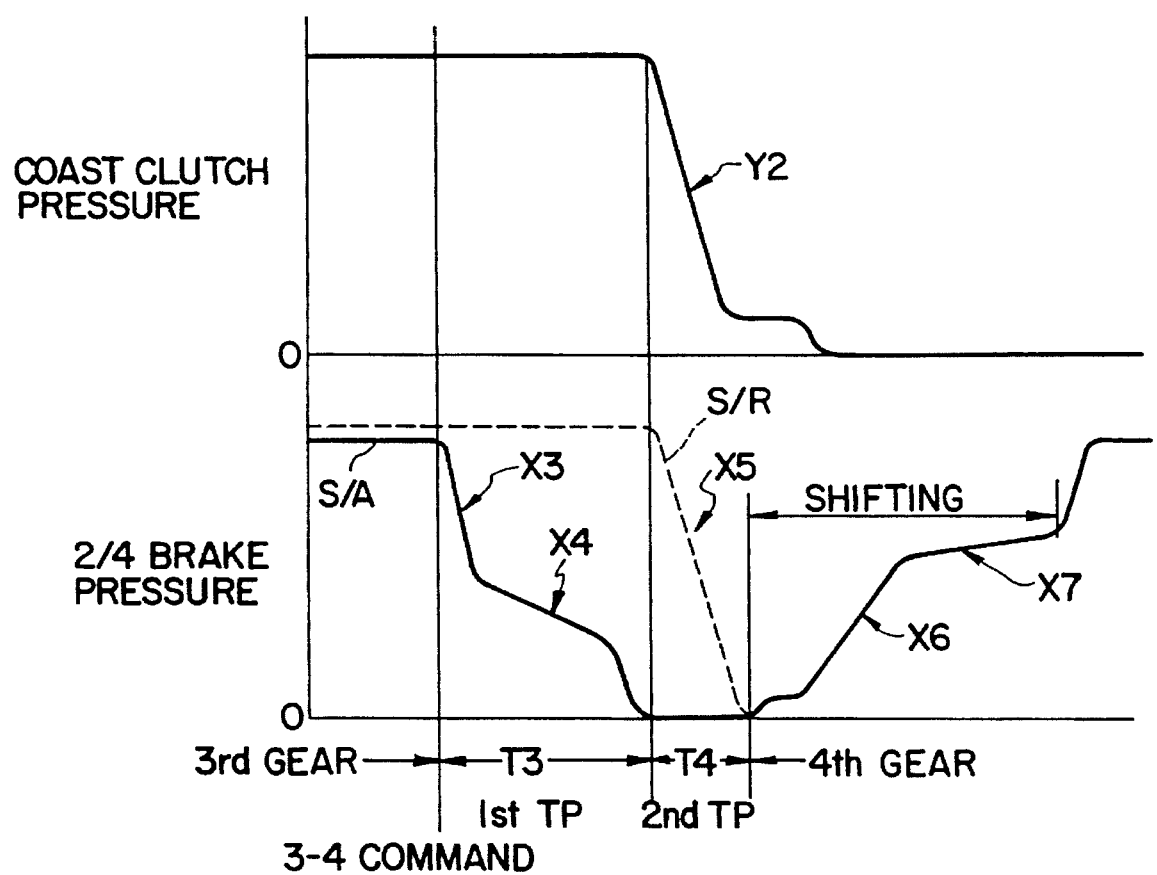
FIG. 7 a time chart showing changes in control pressure for the 3–4 gear shift.
Figure 8:
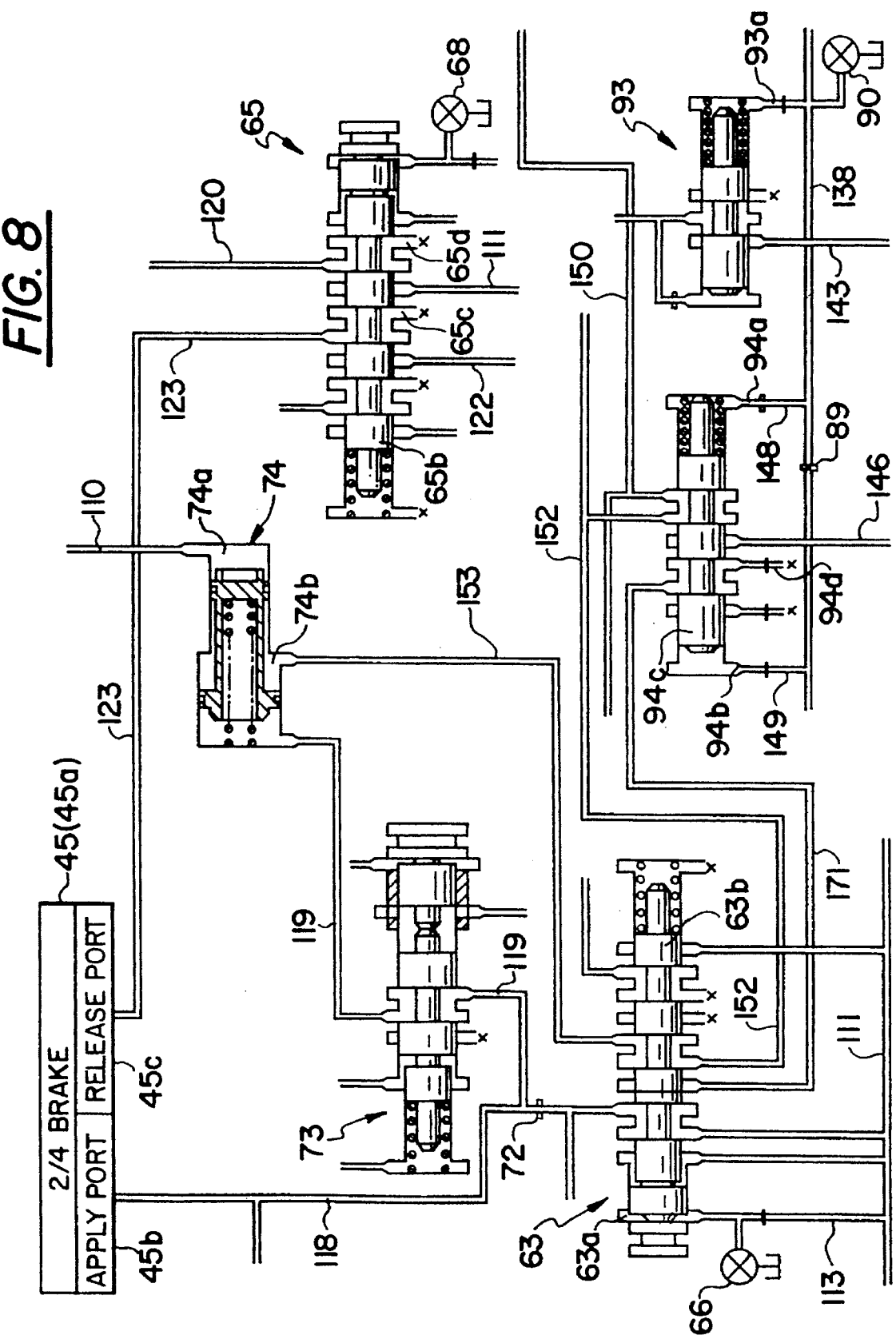
FIG. 8 is an enlarged diagram showing an essential part of the hydraulic control circuit which is under the operation of 3–4 gear shift.

Describing the 3–4 shift-up in detail with reference to FIGS. 7 and 8, when a 3–4 shift command is provided, the controller 200 selectively turns the first to third solenoid valves 66–68 from the third gear pattern (3rd GP) wherein only the first solenoid valve 66 has been turned ON to the second transitional pattern (2nd TP). Only the first solenoid valve 66 is turned ON in the third gear pattern (3rd GP) leaving the second and third solenoid valves 67 and 68 turned OFF. Then, the first gear-shift valve 63 forces the spool 63b in the right end position as shown in FIG. 6, so as to bring the brake apply pressure line 118 leading to the actuator 45a at the apply pressure port 45b into communication with the drain pressure line 152 leading to the switching valve 94 at a pressure drain port 94d, draining the brake apply pressure (S/A) from the actuator 45a through the switching valve 94 via the apply pressure port 45b. At this time, since the gear-shift valve 63 also brings the pressure line 153 leading to the second back pressure chamber 74b of the 1/2 accumulator 74 into communication with the drain port 63c thereof, only the line pressure introduced into the first back pressure chamber 74a of the 1/2 accumulator 74 from the main pressure line 110 is exerted as back pressure on the 1/2 accumulator 74. As a result, during the first transitional period (T3) of 3–4 shift-up, after the brake apply pressure (S/A) has dropped rapidly as shown by a reference X1, it drops down gently providing a shelf pressure as shown by a reference X4. When the brake apply pressure (S/A) drops sufficiently close to a level of zero (0) at the end of the first transitional period (T3) after the commencement of 3–4 shift-up, the controller 200 selectively changes the first to third solenoid valves 66–68 from the second transitional pattern (2nd TP), wherein all of the first to third solenoid valves 66–68 have been turned OFF to first transitional pattern (1st TP). As a result, the third solenoid valve 68 is turned ON leaving the first and second solenoid valves 66 and 67 turned OFF. This causes the third gear-shift valve 65 to displace its spool 65b into the right end position shown in FIG. 8 from the left end position shown in FIG. 6, bringing the brake release pressure line 123 leading to the actuator 45a at the release pressure port 45c into communication with a drained port 65c of the third gear-shift valve 65 and simultaneously the coast clutch pressure line 120 leading to the coast clutch 42 with a drain port 65d thereof. In this instance, no orifice is provided in the brake release pressure (S/R) line 123, the brake release pressure (S/R) is drain rapidly as shown by a reference X5. On the other hand, since the one-way orifice 76 in the coast clutch pressure line 120 restrains the flow of working oil in the direction of oil supply only, the coast clutch locking pressure drops also rapidly as shown by a reference Y2

At the end of the second first transitional period (T4), the first to third gear-shift valves 63–65 are turned into and hold the fourth gear pattern (4GP). In the fourth gear pattern (4GP), the first solenoid valve 66 is energized or turned ON leaving the second and third solenoid valves 67 and 68 turned OFF and ON, respectively, forcing the first gear-shift valve 63 to displace the spool 63b into the left end position as shown in FIG. 8, so as to bring the brake apply pressure line 118 into communication with the forward clutch pressure line 111 again, thereby supplying the line pressure introduced into the first gear-shift valve 63 through the forward clutch pressure line 111 as a brake apply pressure (S/A) into the apply pressure port 45c of the actuator 45a through the brake apply pressure line 118 and the first bypass pressure line 160. At this time, since the first gear-shift valve 63 also brings the pressure line 153 leading to the second back pressure chamber 74b of the 1/2 accumulator 74 into communication with the pressure line 152 leading to the switching valve 94, the line pressure introduced into the switching valve 94 through the pressure line 150 is supplied as back pressure into the second back pressure chamber 74b of the 1/2 accumulator 74 through the pressure line 154 in communication with the pressure line 153 via the first gear-shift valve 63. In this instance, as was previously described, because the first back pressure chamber 74a of the 1/2 accumulator 74 is supplied with the line pressure as a back pressure from the main pressure line 110, the shelf pressure produced by the 1/2 accumulator 74 is raised in level higher as compared with the 4–3 shift-down. Specifically, the brake apply pressure (S/A) raises relatively rapidly to a predetermined level at the beginning of being supplied to the actuator 45a as shown by a reference X6 in FIG. 7, and then further raises as a high level of shelf pressure as shown by a reference X7. This pressure change causes the 2/4 brake 45 to be locked in a short time period without undesirable slippage, enabling the automatic transmission 10 to provide a desirable gear-shift operation without accompanying an excessive drip in output torque.

As described above and apparent from FIGS. 5 and 7, with the automatic transmission 10 of this invention, the accumulator 74 provides a desired level of shelf pressure not only during the 4–3 shift-down in which the 2/4 brake 45 is released or unlocked but also during the 3–4 shift-up in which it is locked.

In the automatic transmission 10 of this embodiment described above, the use of the first gear-shift valve 63 to change the supply of back pressure to the 1/2 accumulator 74 between the first and second back pressure chambers 74a and 74b avoids any provision of extra valves, so as to enable the hydraulic control circuit 60 to be simplified in configuration.

Changing of the level of shelf pressure between 3–4 and 4–3 gear shifts may be performed by means of a control valve for producing the locking pressure for the 2/4 brake 45 in place of the 1/2 accumulator 74.

Figure 9:
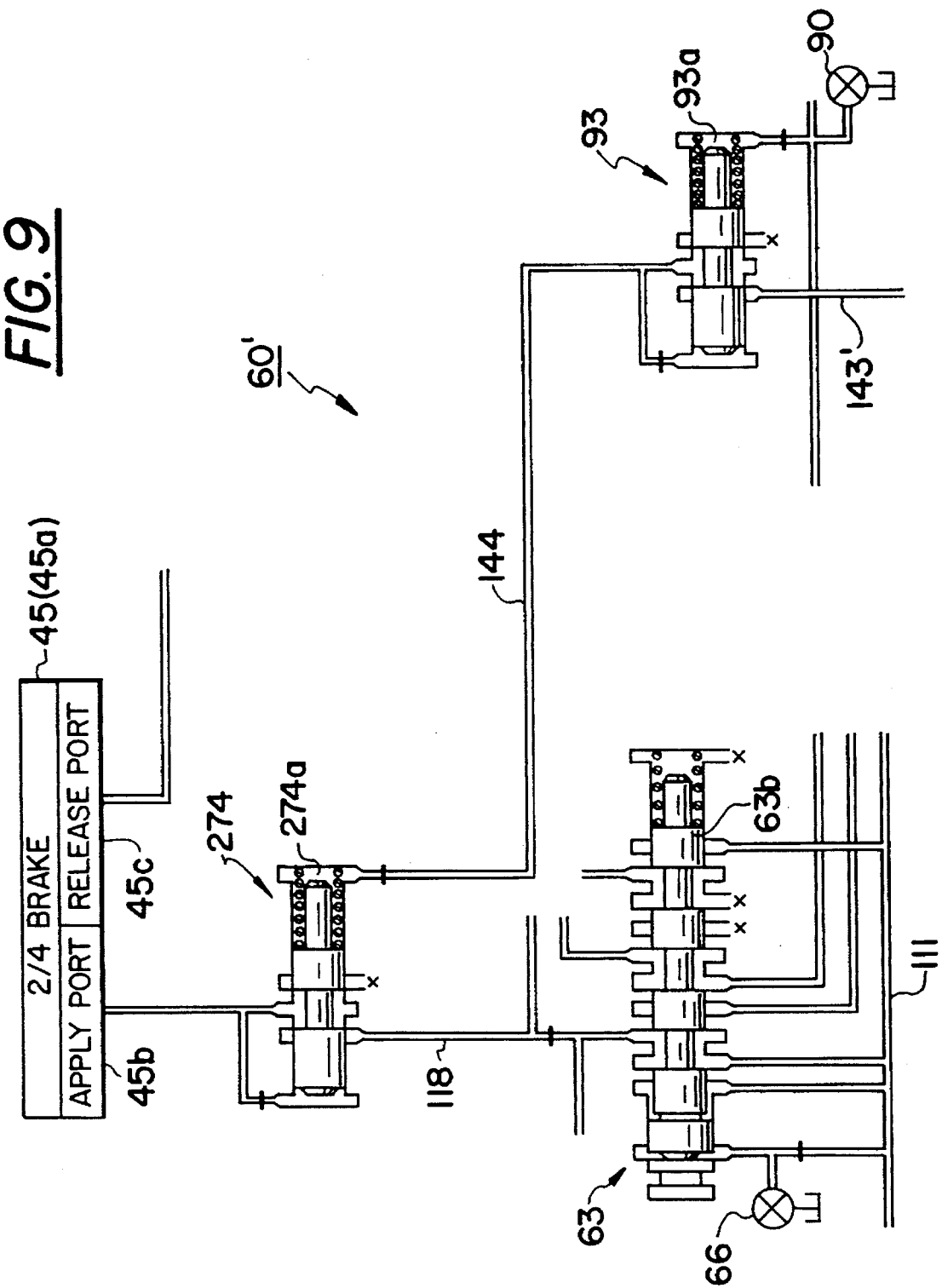
FIG. 9 is an enlarged diagram showing an essential part of a hydraulic control circuit in accordance with another preferred embodiment of the present invention.

Referring to FIG. 9 showing a hydraulic control circuit 60', which is similar to the hydraulic control circuit 60 in the previous embodiment with the exception of a control valve 274 used in place of the combination of accumulation cut valve 73 and 1/2 accumulator 74, the control valve 274, disposed in a brake apply pressure line 118 between a first gear-shift valve 63 and actuator 45a of the 2/4 brake 45, is supplied at its control port 274a with a control pressure modulated by a modulation valve 93 through a pressure line 144 and regulates a brake apply pressure (S/A) in the pressure line 118 according to the modulated control pressure. In other words, because the modulation valve 93 regulates a line pressure introduced thereinto from a main pressure line 110 through a pressure line 143 as a modulated control pressure according to a control pressure at its control port 93a regulated by a first duty solenoid valve 90, the level of brake apply pressure (S/A) is controlled according to the duty rate of the first duty solenoid valve 90.

When a 4–3 shift-down is caused, a first solenoid valve 66 is energized or turned ON causing the first gear-shift valve 63 to place its spool 63b to its left end position so as to bring forward pressure line 111 in communication with the brake apply pressure line 118, and then the first duty solenoid valve 90 is operated at a desired duty rate for providing a brake apply pressure (S/A) decreasing by way of a low level of shelf pressure as shown by the reference X2 in FIG. 5.

When a 3–4 shift-up is caused, while the first solenoid valve 66 is energized or turned ON causing the first gear-shift valve 63 to place its spool 63b to its left end position so as to bring the forward pressure line 111 in communication with the brake apply pressure line 118, the first duty solenoid valve 90 is operated so as to increase a brake apply pressure (S/A) by way of a high level of shelf pressure as shown by the reference X6 in FIG. 7 after having decreased it (S/A) to a level of zero (0).

In any of the embodiments described above, the automatic transmission does not cause shift shocks in excess during a 4–3 shift-up due to abrupt releasing or unlocking of the 2/4 brake 45 caused by abruptly decreasing of brake apply pressure from a high shelf pressure level, nor there is caused the deterioration of gear shift feelings or the strong feeling of disappearance of output torque during a 3–4 shift-up due to a long time needed to lock the 2/4 brake resulting from an extremely low level of shelf pressure.

It is to be understood that although the present invention has been described in detail with respect to a preferred embodiment thereof, various other embodiments and variants may occur to those skilled in the art, which fall within the scope and spirit of the invention. Such other embodiments and variants are intended to be covered by the following claims.

What is claimed is:

1. An automatic transmission control system for selectively locking and unlocking a plurality of hydraulically controlled frictional coupling elements provided within an automatic transmission so as to place the automatic transmission into any one of a plurality of gears, said frictional coupling elements including a specific frictional coupling element and a rotative counter element which are locked with locking pressure developed in a pressure line leading to said specific frictional coupling element so as to restrict rotation of said rotative counter element when the automatic transmission accomplishes a specific gear shift to a specific one of the gears from another of the gears and are unlocked by discharging said locking pressure when the automatic transmission accomplishes an opposite gear shift from said specific gear to said other gear, said automatic transmission control system comprising:

locking pressure control means, which is disposed in said pressure line, for developing said locking pressure in said pressure line so as to increase said locking pressure by way of a level of pressure which changes at a specified gradient during said specific gear shift and reducing said locking pressure by way of a level of pressure which changes at a specified gradient during said opposite gear shift; and pressure level varying means for varying the levels of pressures which change at specified gradients between said specific and opposite gear shifts;

wherein said pressure level varying means varies said levels of pressures so that a transitional portion of pressure developed in said pressure line is higher for said specific gear shift than a transitional portion of pressure developed in said pressure line for said opposite gear shift.

2. An automatic transmission control system for selectively locking and unlocking a plurality of hydraulically controlled frictional coupling elements provided within an automatic transmission so as to place the automatic transmission into any one of a plurality of gears, said frictional coupling elements including a specific frictional coupling element and a rotative counter element which are locked with locking pressure developed in a pressure line leading to said specific frictional coupling element so as to restrict rotation of said rotative counter element when the automatic transmission accomplishes a specific gear shift to a specific one of the gears from another of the gears and are unlocked by discharging said locking pressure when the automatic transmission accomplishes an opposite gear shift from said specific gear to said other gear, said automatic transmission control system comprising:

locking pressure control means, which is disposed in said pressure line, for developing said locking pressure in said pressure line so as to increase said locking pressure by way of a level of pressure which changes at a specified gradient during said specific gear shift and reducing said locking pressure by way of a level of pressure which changes at a specified gradient during said opposite gear shift; and pressure level varying means for varying the levels of pressures which change at specified gradients between said specific and opposite gear shifts;

wherein said specific frictional coupling element and said rotative counter element are locked for a specific gear shift-up of the automatic transmission between said specific one of the gears and the other of the gears in which said specific frictional coupling element restricts rotation of said rotative counter element and are unlocked for a specific gear shift-down of the automatic transmission opposite to said specific gear shift-up.

3. An automatic transmission control system as defined in claim 2, wherein said pressure level varying means varies said levels of pressures so that a transitional portion of pressure developed in said pressure line is higher for said specific gear shift-up than a transitional portion of pressure developed in said pressure line for said specific gear shift-down.

4. An automatic transmission control system for selectively locking and unlocking a plurality of hydraulically controlled frictional coupling elements provided within an automatic transmission so as to place the automatic transmission into any one of a plurality of gears, said frictional coupling elements including a specific frictional coupling element and a rotative counter element which are locked with locking pressure developed in a pressure line leading to said specific frictional coupling element so as to restrict rotation of said rotative counter element when the automatic transmission accomplishes a specific gear shift to a specific one of the gears from another of the gears and are unlocked by discharging said locking pressure when the automatic transmission accomplishes an opposite gear shift from said specific gear to said other gear, said automatic transmission control system comprising:

an accumulator, which is disposed in said pressure line, for developing said locking pressure in said pressure line so as to increase said locking pressure by Way of a level of pressure which changes at a specified gradient during said specific gear shift and reducing said locking pressure by way of a level of pressure which changes at a specified gradient during said opposite gear shift; and pressure level varying means for varying the levels of pressures which change specified gradients between said specific and opposite gear shifts;

wherein said pressure level varying means varies said levels of pressures so that a transitional portion of pressure developed in said pressure line is higher for said specific gear shift than a transitional portion of pressure developed in said pressure line for said opposite gear shift.

5. An automatic transmission control system for selectively locking and unlocking a plurality of hydraulically controlled frictional coupling elements provided within an automatic transmission so as to place the automatic transmission into any one of a plurality of gears, said frictional coupling elements including a specific frictional coupling element and a rotative counter element which are locked with locking pressure developed in a pressure line leading to said specific frictional coupling element so as to restrict rotation of said rotative counter element when the automatic transmission accomplishes a specific gear shift to a specific one of the gears from another of the gears and are unlocked by discharging said locking pressure when the automatic transmission accomplishes an opposite gear shift from said specific gear to said other gear, said automatic transmission control system comprising:

an accumulator, which is disposed in said pressure line, for developing said locking pressure in said pressure line so as to increase said locking pressure by way of a level of pressure which changes at a specified gradient during said specific gear shift and reducing said locking pressure by way of a level of pressure which changes at a specified gradient during said opposite gear shift; and, pressure level varying means for varying the levels of pressures which change at specified gradients between said specific and opposite gear shifts;

wherein said specific frictional coupling element is locked for a specific gear shift-up of the automatic transmission from said specific one of the gears to the other of the gears in which said specific frictional coupling element restricts rotation of its rotative counter element and is unlocked for a gear shift-down of the automatic transmission to said specific one of the gears from said other of the gears.

6. An automatic transmission control system for selectively locking and unlocking a plurality of hydraulically controlled frictional coupling elements provided within an automatic transmission so as to place the automatic transmission into any one of a plurality of gears, said frictional coupling elements including a specific frictional coupling element and a rotative counter element which are locked with locking pressure developed in a pressure line leading to said specific frictional coupling element so as to restrict rotation of said rotative counter element when the automatic transmission accomplishes a specific gear shift to a specific one of the gears from another of the gears and are unlocked by discharging said locking pressure when the automatic transmission accomplishes an opposite gear shift from said specific gear to said other gear, said automatic transmission control system comprising:

an accumulator, which is disposed in said pressure line, for developing said locking pressure in said pressure line so as to increase said locking pressure by way of a level of pressure which changes at a specified gradient during said specific gear shift and reducing said locking pressure by way of a level of pressure which changes at a specified gradient during said opposite gear shift; and pressure level varying means for varying the levels of pressures which change at specified gradients between said specific and opposite gear shifts;

wherein said pressure level varying means comprises a shift valve for switching development of said locking pressure in said specific frictional coupling element and discharging of said locking pressure from said specific frictional coupling element.

7. An automatic transmission control system as defined in claim 5, wherein said pressure level varying means varies said levels of pressures so that a transitional portion of pressure developed in said pressure line is higher for said specific gear shift-up than a transitional portion of pressure developed in said pressure line for said gear shift-down.

* * * * *